United States Patent
Horng et al.

(10) Patent No.: US 10,992,194 B2
(45) Date of Patent: Apr. 27, 2021

(54) ROTOR OF AN INNER-ROTOR MOTOR WITH RELIABLE ENGAGEMENT BETWEEN THE SHAFT AND THE PERMANENT MAGNETS

(71) Applicant: Sunonwealth Electric Machine Industry Co., Ltd., Kaohsiung (TW)

(72) Inventors: Alex Horng, Kaohsiung (TW); Ming-Tsung Li, Kaohsiung (TW); Mu-Kai Yu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 45 days.

(21) Appl. No.: 16/001,101

(22) Filed: Jun. 6, 2018

(65) Prior Publication Data
US 2019/0020235 A1 Jan. 17, 2019

(30) Foreign Application Priority Data
Jul. 4, 2017 (TW) .................. 106122394

(51) Int. Cl.
*H02K 1/28* (2006.01)
*H02K 1/27* (2006.01)
*H02K 7/00* (2006.01)
*H02K 15/03* (2006.01)

(52) U.S. Cl.
CPC ............ *H02K 1/28* (2013.01); *H02K 1/2733* (2013.01); *H02K 7/003* (2013.01); *H02K 15/03* (2013.01)

(58) Field of Classification Search
CPC ............ H02K 1/06; H02K 1/22; H02K 1/223; H02K 1/27; H02K 1/2706; H02K 1/2713; H02K 1/272; H02K 1/2726; H02K 1/2733; H02K 1/274; H02K 1/278; H02K 1/28; H02K 7/003; H02K 15/02; H02K 15/03; H02K 1/30
USPC .......................................... 310/156.08, 156.09
See application file for complete search history.

(56) References Cited

U.S. PATENT DOCUMENTS

| 4,433,261 A | * | 2/1984 | Nashiki | H02K 1/278 310/156.28 |
| 5,298,826 A | * | 3/1994 | Lee | H02K 1/2733 310/156.09 |
| 5,691,589 A | * | 11/1997 | Keim | H02K 1/2786 29/596 |
| 5,834,870 A | * | 11/1998 | Tokushima | F16C 33/1035 310/90 |
| 5,973,426 A | * | 10/1999 | Fujinaka | H02K 1/14 310/268 |

(Continued)

FOREIGN PATENT DOCUMENTS

| CN | 86103245 A | 11/1987 |
| TW | M520205 U | 4/2016 |

*Primary Examiner* — Alex Torres-Rivera
*Assistant Examiner* — David A. Singh
(74) *Attorney, Agent, or Firm* — Alan D. Kamrath; Karin L. Williams; Mayer & Williams PC

(57) ABSTRACT

A rotor of an inner-rotor motor includes a shaft having a connecting portion. A permanent magnet is mounted around the connecting portion of the shaft. The permanent magnet includes at least one first engaging portion. At least one coupling member includes a through-hole. The shaft extends through the through-hole. The at least one coupling member includes a second engaging portion engaged with the at least one first engaging portion of the permanent magnet.

19 Claims, 6 Drawing Sheets

(56) References Cited

U.S. PATENT DOCUMENTS

| | | | | |
|---|---|---|---|---|
| 6,426,576 B1* | 7/2002 | Varenne | | H02K 1/2773 310/156.09 |
| 9,219,389 B2 | 12/2015 | Nonaka | | |
| 2004/0004407 A1* | 1/2004 | Laurent | | H02K 1/2773 310/156.48 |
| 2005/0225190 A1* | 10/2005 | Kinashi | | H02K 1/2733 310/156.13 |
| 2006/0097601 A1* | 5/2006 | Hauger | | H02K 1/2773 310/216.004 |
| 2007/0080597 A1* | 4/2007 | Suzuki | | H02K 1/2733 310/156.47 |
| 2007/0132336 A1* | 6/2007 | Ionel | | H02K 1/22 310/261.1 |
| 2007/0138903 A1* | 6/2007 | Chang | | H02K 1/2733 310/261.1 |
| 2007/0159030 A1* | 7/2007 | Naganuma | | H02K 1/243 310/49.08 |
| 2007/0194648 A1* | 8/2007 | Evans | | H02K 1/28 310/156.16 |
| 2008/0179980 A1* | 7/2008 | Dawsey | | H02K 1/2766 310/156.53 |
| 2008/0315691 A1* | 12/2008 | Jeung | | H02K 1/2733 310/51 |
| 2009/0001826 A1* | 1/2009 | Suzuki | | H02K 1/2733 310/261.1 |
| 2009/0195101 A1* | 8/2009 | Yang | | H02K 1/278 310/156.22 |
| 2009/0284094 A1* | 11/2009 | Horng | | H02K 1/30 310/156.22 |
| 2011/0062812 A1* | 3/2011 | Horng | | H02K 1/2733 310/156.22 |
| 2012/0326548 A1* | 12/2012 | Nonaka | | H02K 1/2773 310/156.19 |
| 2014/0175929 A1 | 6/2014 | Horng et al. | | |
| 2015/0084464 A1* | 3/2015 | Ramdane | | H02K 1/28 310/90.5 |
| 2015/0249367 A1* | 9/2015 | Vestermark Vad | | H02K 1/2733 310/43 |
| 2016/0020656 A1* | 1/2016 | Brahmavar | | H02K 15/03 310/156.12 |

\* cited by examiner

ROTOR OF AN INNER-ROTOR MOTOR WITH RELIABLE ENGAGEMENT BETWEEN THE SHAFT AND THE PERMANENT MAGNETS

CROSS REFERENCE TO RELATED APPLICATION

The application claims the benefit of Taiwan application serial No. 106122394, filed on Jul. 4, 2017, and the entire contents of which are incorporated herein by reference.

BACKGROUND OF THE INVENTION

1. Field of the Invention

The present invention relates to a rotor and, more particularly, to a rotor of an inner-rotor motor, with the rotor including a shaft coupled with a permanent magnet.

2. Description of the Related Art

Conventional motor rotor structures include a shaft and a permanent magnet. The permanent magnet is cylindrical and includes a central axial hole receiving the shaft. Thus, the permanent magnet is coupled to and synchronously rotatable with the shaft.

The coupling between the shaft and the permanent magnet includes applying an adhesive between the shaft and an inner periphery of the central axial hole of the permanent magnet to securely fix the permanent magnet and the shaft and to permit synchronous rotation. However, the adhesive has a certain service life. Furthermore, the adhesive is liable to deteriorate and lose its adhesive effect, because the rotor structure generally operates in a high-temperature, high-speed condition for a long period of time.

Thus, improvement to the conventional motor rotors is necessary.

SUMMARY OF THE INVENTION

To solve the above problem, the present invention provides a rotor of an inner-rotor motor, with the rotor having enhanced coupling reliability.

When the terms "front", "rear", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

A rotor of an inner-rotor motor according to the present invention includes a shaft including a connecting portion. A permanent magnet is mounted around the connecting portion of the shaft. The permanent magnet includes at least one first engaging portion. At least one coupling member includes a through-hole. The shaft extends through the through-hole. The at least one coupling member includes a second engaging portion engaged with the at least one first engaging portion of the permanent magnet.

Thus, in the rotor of an inner-rotor motor according to the present invention, the permanent magnet is mounted to the connecting portion of the shaft, the at least one first engaging portion of the permanent magnet engages with the second engaging portion of the at least one coupling member, and the fixing member is coupled with the second positioning portion of the shaft, such that the shaft, the permanent magnet and the at least one coupling member have enhanced coupling stability therebetween, effectively preventing the permanent magnet from displacing axially relative to or falling off from the shaft as well as preventing the permanent magnet from moving in a radial direction perpendicular to the rotating axis of the shaft or loosening in a circumferential direction.

In an example, the shaft further includes a first positioning portion, the at least one coupling member is coupled to an end of the permanent magnet, and another end of the permanent magnet abuts against the first positioning portion. Thus, the permanent magnet is prevented from displacing axially relative to the shaft.

In an example, an outer diameter of the first positioning portion is smaller than or equal to an outer diameter of the at least one coupling member, and the outer diameter of the at least one coupling member is smaller than or equal to an outer diameter of the permanent magnet. This avoids the at least one coupling member from contacting with the stator during rotation. Furthermore, the permanent magnet and the stator have a minimum air gap therebetween.

In an example, the permanent magnet consists of a plurality of magnet segments. Thus, the permanent magnet is easy to magnetize.

In an example, the plurality of magnet segments has an identical structure. Thus, the permanent magnet is easy to magnetize, process, and manufacture.

In an example, the permanent magnet consists of four magnet magnets. Thus, the permanent magnet is easy to magnetize, process, and manufacture.

In another example, the permanent magnet consists of two magnet segments. Thus, the permanent magnet is easy to magnetize, process, and manufacture.

In a further example, the permanent magnet is a single annular member. Thus, the assembly is more convenient.

In an example, the permanent magnet includes a through-hole, and the connecting portion of the shaft is received in the through-hole. Thus, the assembly is more convenient.

In an example, the connecting portion of the shaft includes non-circular cross sections perpendicular to a rotating axis of the shaft. Thus, the permanent magnet is prevented from loosening in a circumferential direction relative to the shaft.

In an example, the non-circular cross sections are polygonal. Thus, the permanent magnet is prevented from loosening in a circumferential direction relative to the shaft.

In an example, the at least one coupling member includes two coupling members. Thus, the permanent magnet is prevented from displacing axially relative to the shaft.

In an example, each of the at least one first engaging portion and the second engaging portion includes a conical face having a slope. Thus, the permanent magnet is prevented from displacing relative to the shaft in a radial direction perpendicular to the rotating axis of the shaft.

In an example, the slope of the at least one first engaging portion and the slope of the second engaging portion are complementary to each other. Thus, the permanent magnet is prevented from displacing relative to the shaft in a radial direction perpendicular to the rotating axis of the shaft.

In an example, the connecting portion of the shaft includes circular cross sections perpendicular to a rotating axis of the shaft. Thus, an easy-to-assemble coupling effect can be achieved.

In an example, the at least one first engaging portion of the permanent portion includes a reduced portion to form a shoulder, the second engaging portion of the at least one coupling member is in a form of a cap, and the second engaging portion engages with the at least one first engaging portion. This effectively prevents the permanent magnet from displacing relative to the shaft in a radial direction perpendicular to the rotating axis of the shaft or loosening in a circumferential direction.

In an example, the rotor of the inner-rotor motor further includes a fixing member, the shaft further includes a second positioning member, and the fixing member is coupled to the second positioning portion of the shaft. Thus, loosening between the permanent magnet and the at least one coupling member is prevented.

In an example, the rotor of the inner-rotor further includes a pad member mounted around the shaft and located between the at least one coupling member and the fixing member. Thus, the tightness between the fixing member and the at least one coupling member is increased.

In an example, the connecting portion includes a polygon having an end with rounded corners adjacent to the at least one coupling member. Thus, coupling with the at least one coupling member is easier.

In an example, the permanent magnet further includes at least one first coupling portion, and the at least one coupling member further includes at least one second coupling portion coupled with the at least one first coupling portion. Thus, the permanent magnet and the at least one coupling member can be coupled with each other.

In an example, each of the at least one first coupling portion is a V-shaped groove, and each of the at least one second coupling portion is an inverted V-shaped protrusion. Thus, the permanent magnet and the at least one coupling member can be coupled with each other.

In an example, an axial length of the connecting portion of the shaft is larger than an axial length of the permanent magnet. Thus, a better coupling effect is provided.

The present invention will become clearer in light of the following detailed description of illustrative embodiments of this invention described in connection with the drawings.

DETAILED DESCRIPTION OF THE INVENTION

Figure 1:
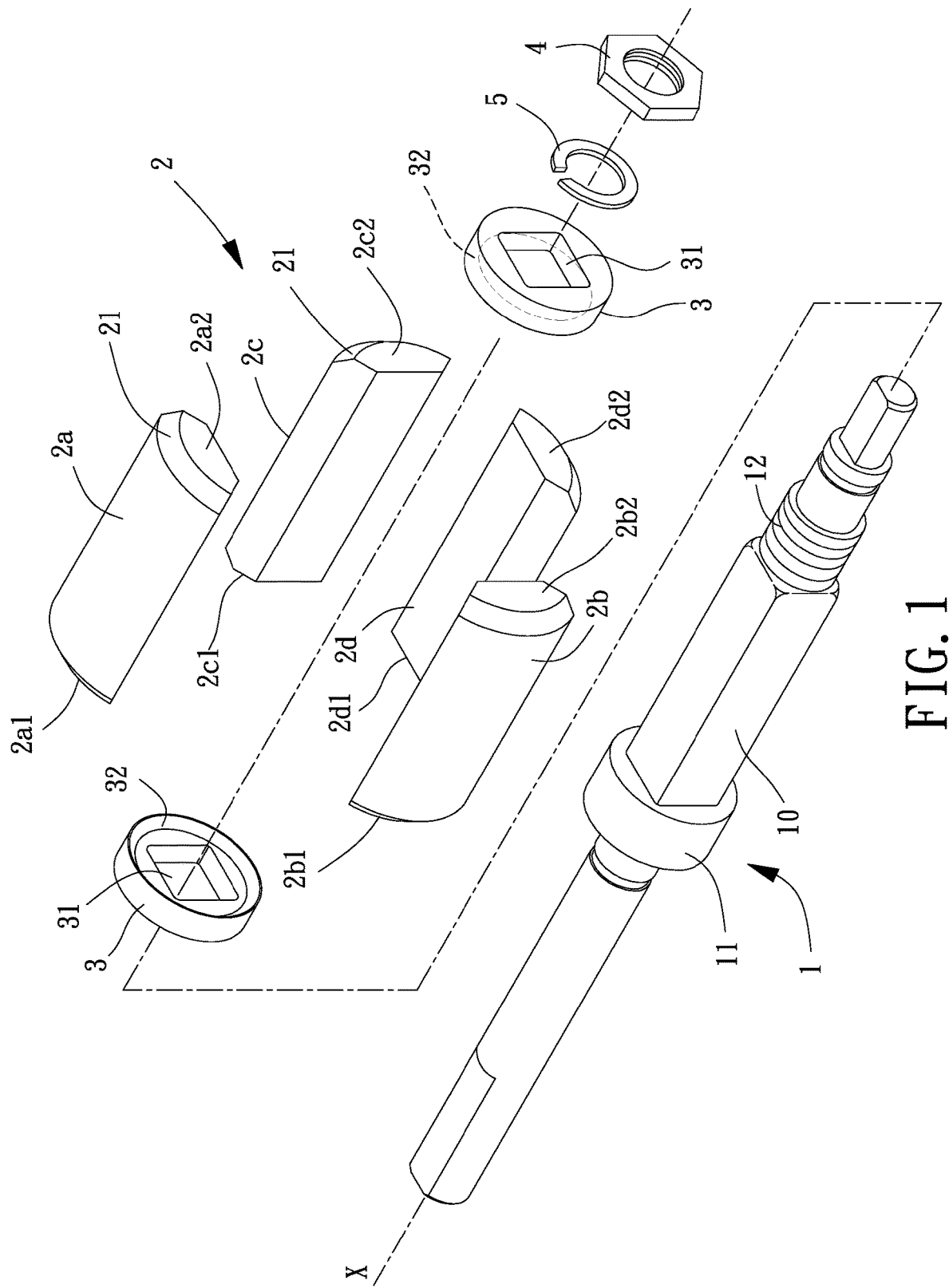
FIG. 1 is an exploded, perspective view of a rotor of an inner-rotor motor of a first embodiment according to the present invention.
Figure 2:
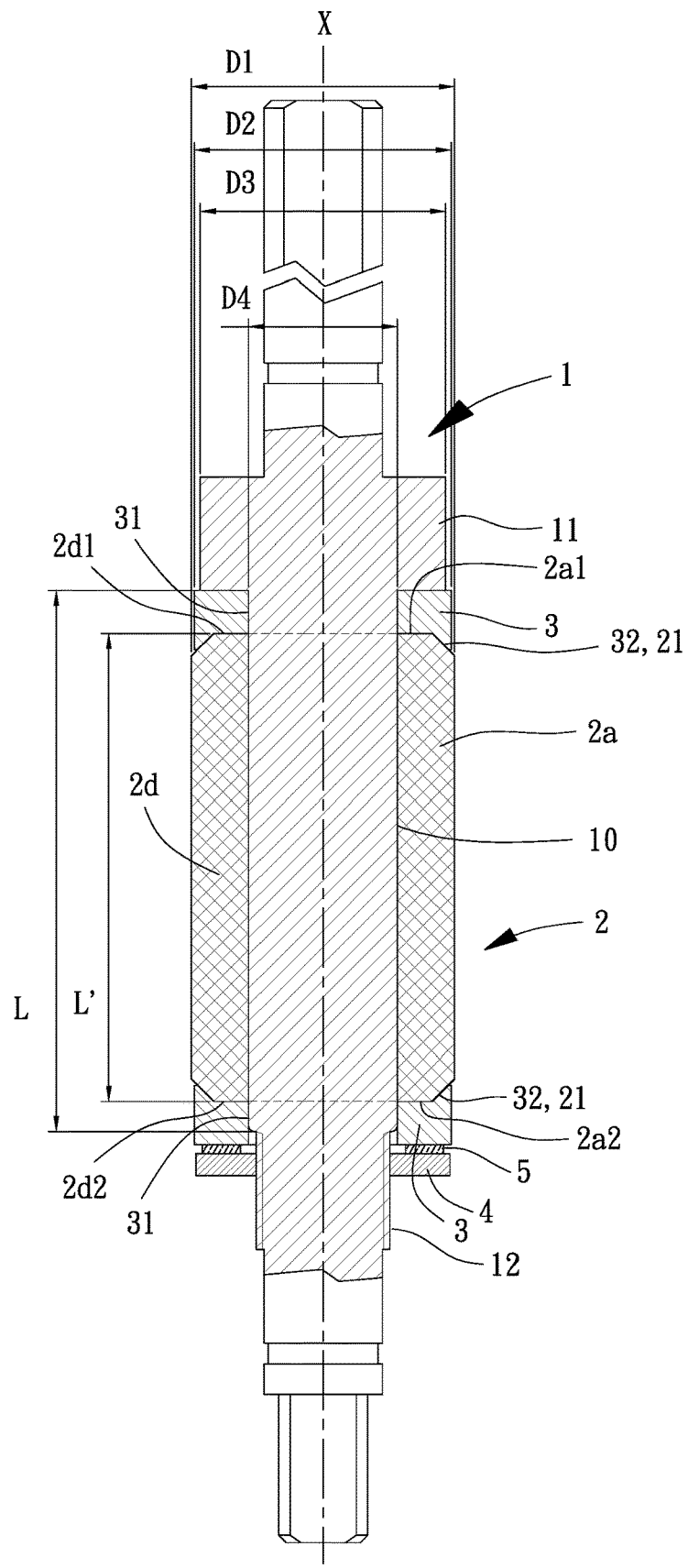
FIG. 2 is a cross sectional view of the rotor of FIG. 1 after assembly.

FIGS. 1 and 2 show a rotor of an inner-rotor motor of a first embodiment according to the present invention. In this embodiment, the rotor of the inner-rotor motor includes a shaft 1, a permanent magnet 2, and at least one coupling member 3. The permanent magnet 2 is mounted around the connecting portion 10 of the shaft 1. The at least one coupling member 3 is mounted around the shaft 1 and is coupled to an end of the permanent magnet 2. An axial length L of the connecting portion 10 of the shaft 1 is larger than an axial length L' of the permanent magnet 2.

With reference to FIGS. 1 and 2, the shaft 1 includes a rotating axis X about which the shaft 1 is rotatable. The shaft 1 includes a connecting portion 10. The cross sections of the connecting portion 10 of the shaft 1 perpendicular to the rotating axis X are preferably non-circular. The cross sections of the connecting portion 10 can be but are not limited to polygonal, such as square, hexagonal, etc. In this embodiment, the cross sections of the connecting portion 10 are square. The shaft 1 further includes a first positioning portion 11 contiguous to an end of the connecting portion 10. The cross sections of the first positioning portion 11 do not completely match with the cross sections of the connecting portion 10. An outer diameter D3 of the first positioning portion 11 perpendicular to the rotating axis X is larger than an outer diameter D4 of the connecting portion 10 perpendicular to the rotating axis X, such that an outer periphery of the first positioning portion 11 is radially outwards of an outer periphery of the connecting portion 10. The shaft 1 further includes a second positioning portion 12 spaced from the first positioning portion 11 by a spacing. The connecting portion 10 includes a polygon having an end with rounded corners adjacent to the at least one coupling member 3.

With reference to FIGS. 1 and 2, the permanent magnet 2 consists of a plurality of magnet segments, such that the permanent magnet 2 can be annularly mounted around the outer periphery of the connecting portion 10. In this embodiment, the permanent magnet 2 includes four magnet segments 2a, 2b, 2c, and 2d. Preferably, the magnet segments 2a, 2b, 2c, and 2d have an identical structure, and each of the magnet segments 2a, 2b, 2c, and 2d is a quarter of a circle in cross section. Thus, the magnet segments 2a, 2b, 2c, and 2d can be assembled to form the permanent magnet 2 and are annularly mounted around the outer periphery of the connecting portion 10. Each magnet segment 2a, 2b, 2c, 2d has a first end 2a1, 2b1, 2c1, 2d1 and a second end 2a2, 2b2, 2c2, 2d2. Each of the first end 2a1, 2b1, 2c1, 2d1 and the second end 2a2, 2b2, 2c2, 2d2 has a first engaging portion 21. Preferably, each first engaging portion 21 is a conical face.

With reference to FIGS. 1 and 2, the number of the at least one coupling member 3 is two. Each of the two coupling members 3 includes a through-hole 31 coupled with the shaft 1. The two coupling members 3 are coupled with the first end 2a1, 2b1, 2c1, 2d1 and the second end 2a2, 2b2, 2c2, 2d2 of the permanent magnet 2, respectively. The at least one coupling member 3 includes a second engaging portion 32 engaged with each first engaging portion 21 of the permanent magnet 2. Various engagement provisions between the at least one coupling member 3 and the permanent magnet 2 are permissible, and the present invention is not limited in this regard. Each second engaging portion 32 is preferably a conical face, such as an inclined face or an arcuate face. Furthermore, the slope of each first engaging portion 21 and the slope of each second engaging portion 32 are preferably complementary to each other, such that the first engaging portions 21 and the second engaging portion 32 can be tightly coupled with each other. Particularly, since an air gap exists between the permanent magnet 2 and a stator (not shown), an outer diameter $D_3$ of the first positioning portion 11 is preferably smaller than or equal to an outer diameter $D_2$ of the at least one coupling member 3, and the outer diameter $D_2$ of the at least one coupling member 3 is preferably smaller than or equal to an outer diameter $D_1$ of the permanent magnet 2. This avoids the at least one coupling member 3 from contacting with the stator during rotation. Thus, the permanent magnet 2 and the stator have a minimum air gap therebetween.

With reference to FIGS. 1 and 2, the rotor of the inner-rotor motor further includes a fixing member 4 mounted around the shaft 1 for fixing the permanent magnet 2 and the at least one coupling member 3. The fixing member 4 is coupled to the second positioning portion 12 of the shaft 1, and the coupling is preferably threading coupling, such that the permanent magnet 2 and the at least one coupling member 3 can be fixed to the shaft 1. Furthermore, to prevent the at least one coupling member 3 from loosening, a pad member 5 can be mounted between the at least one coupling member 3 and the fixing member 4. The pad member 5 is mounted around the shaft 1 and is located between the at least one coupling member 3 and the fixing member 4. Thus, the pad member 5 prevents the fixing member 4 from loosening due to rotation. The pad member 5 is preferably resilient (such as a resilient washer) for increasing the tightness between the fixing member 4 and the at least one coupling member 3.

With reference to FIGS. 1 and 2, by the above structure, when the permanent magnet 2 is mounted around the outer periphery of the connecting portion 10 of the shaft 1, the at least one coupling member 3 coupled to the first end 2a1, 2b1, 2c1, 2d1 of the permanent magnet 2 abuts against the first positioning portion 11 of the shaft 1. Furthermore, each first engaging portion 21 of the permanent magnet 2 is coupled with a respective second engaging portion 32 of the at least one coupling member 3. Furthermore, by the coupling between the fixing member 4 and the second positioning portion 12 of the shaft 1, the second end 2a2, 2b2, 2c2, 2d2 of the permanent magnet 2 is in a tightly coupled state with the at least one coupling member 3. Thus, the shaft 1, the permanent magnet 2, and the at least one coupling member 3 have enhanced coupling stability therebetween. When the shaft 1 rotates about the rotating axis X, the permanent magnet 2 is prevented from displacing axially relative to or falling off from the shaft 1. Also, the permanent magnet 2 is prevented from moving in a radial direction perpendicular to the rotating axis X of the shaft 1 or loosening in a circumferential direction.

Figure 3:
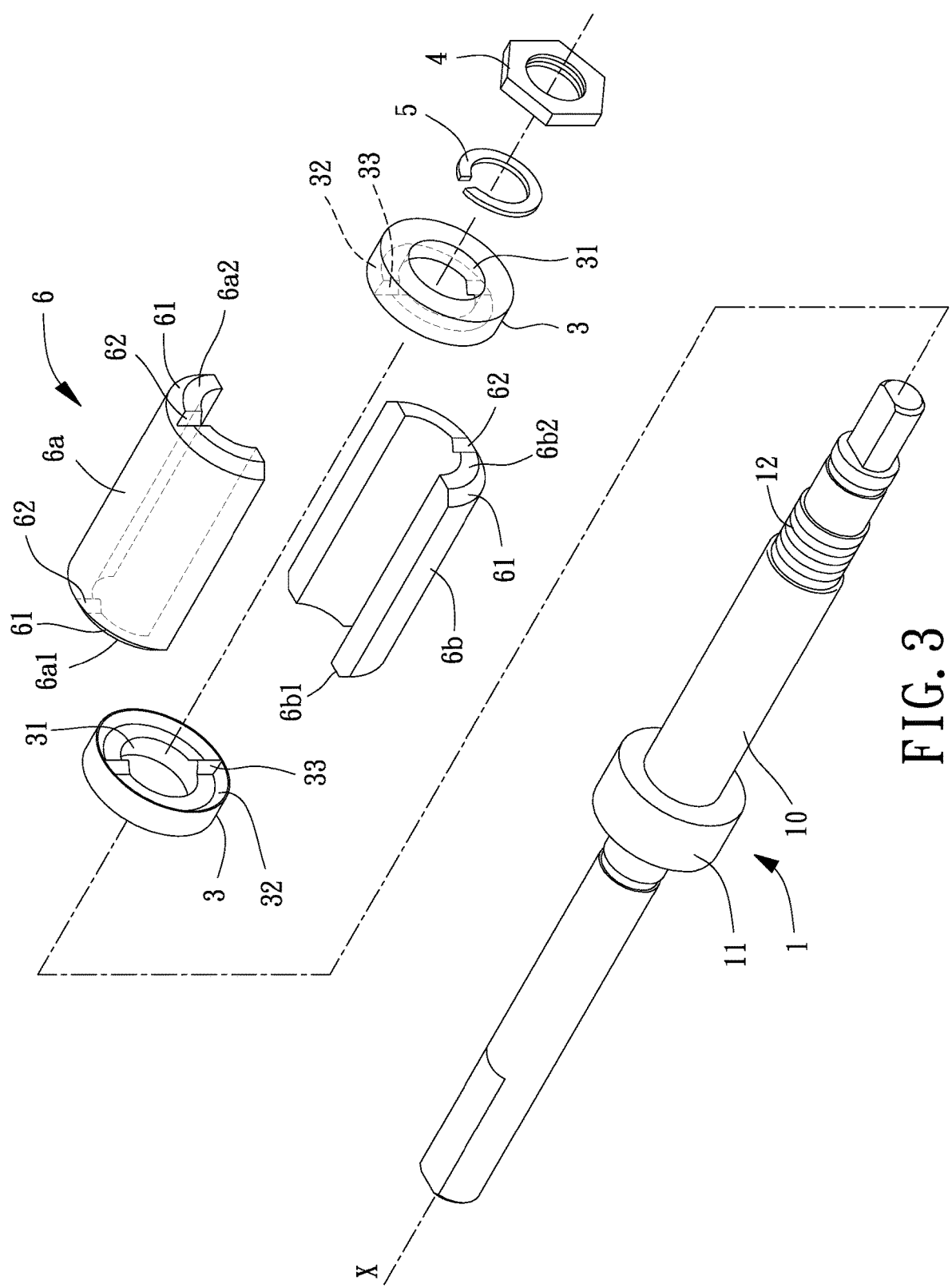
FIG. 3 is an exploded, perspective view of a rotor of an inner-rotor motor of a second embodiment according to the present invention.
Figure 4:
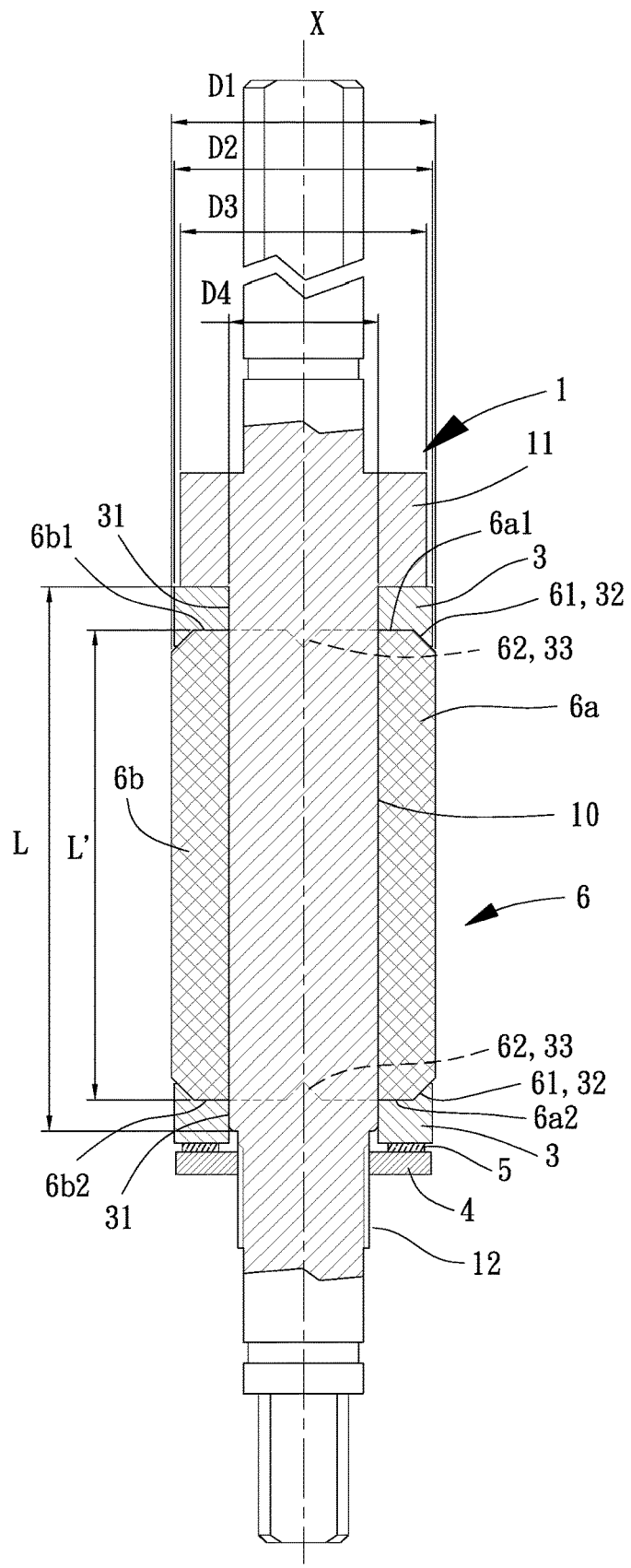
FIG. 4 is a cross sectional view of the rotor of FIG. 3 after assembly.

FIGS. 3 and 4 show a rotor of an inner-rotor motor of a second embodiment according to the present invention. In this embodiment, the connecting portion 10 of the shaft 1 has circular cross sections. The permanent magnet 6 consists of two magnet segments 6a and 6b preferably having an identical structure. Each magnet segment 6a, 6b is semicircular in cross section. Thus, the magnet segments 6a, 6b can be assembled to form the permanent magnet 6 and are annularly mounted around the outer periphery of the connecting portion 10. Each magnet segment 6a, 6b has a first end 6a1, 6b1 and a second end 6a2, 6b2. Each of the first end 6a1, 6b1 and the second end 6a2, 6b2 has a first engaging portion 61 and a first coupling portion 62. Preferably, each first engaging portion 61 is a conical face. The at least one coupling member 3 further includes a plurality of second coupling portions 33 coupled with the first coupling portions 62. In an example, each first coupling portion 62 is a V-shaped groove, and each second coupling portion 33 is an inverted V-shaped protrusion. Thus, each first coupling portion 62 and a respective second coupling portion 33 can couple with each other.

With reference to FIGS. 3 and 4, according to the above structure, in comparison with the first embodiment, each first coupling portion 62 of the permanent magnet 6 of this embodiment is coupled with the respective second coupling portion 33 of the at least one coupling member 3, such that the coupling areas between two ends of the permanent magnet 6 and the at least one coupling member 3 are increased. Thus, the permanent magnet 6 and the at least one coupling member 3 can couple with each other to provide a better coupling effect therebetween while effectively preventing the permanent magnet 6 from displacing axially relative to or falling off from the shaft 1 as well as preventing the permanent magnet 6 from moving in a radial direction perpendicular to the rotating axis X of the shaft 1 or loosening in a circumferential direction.

Figure 5:
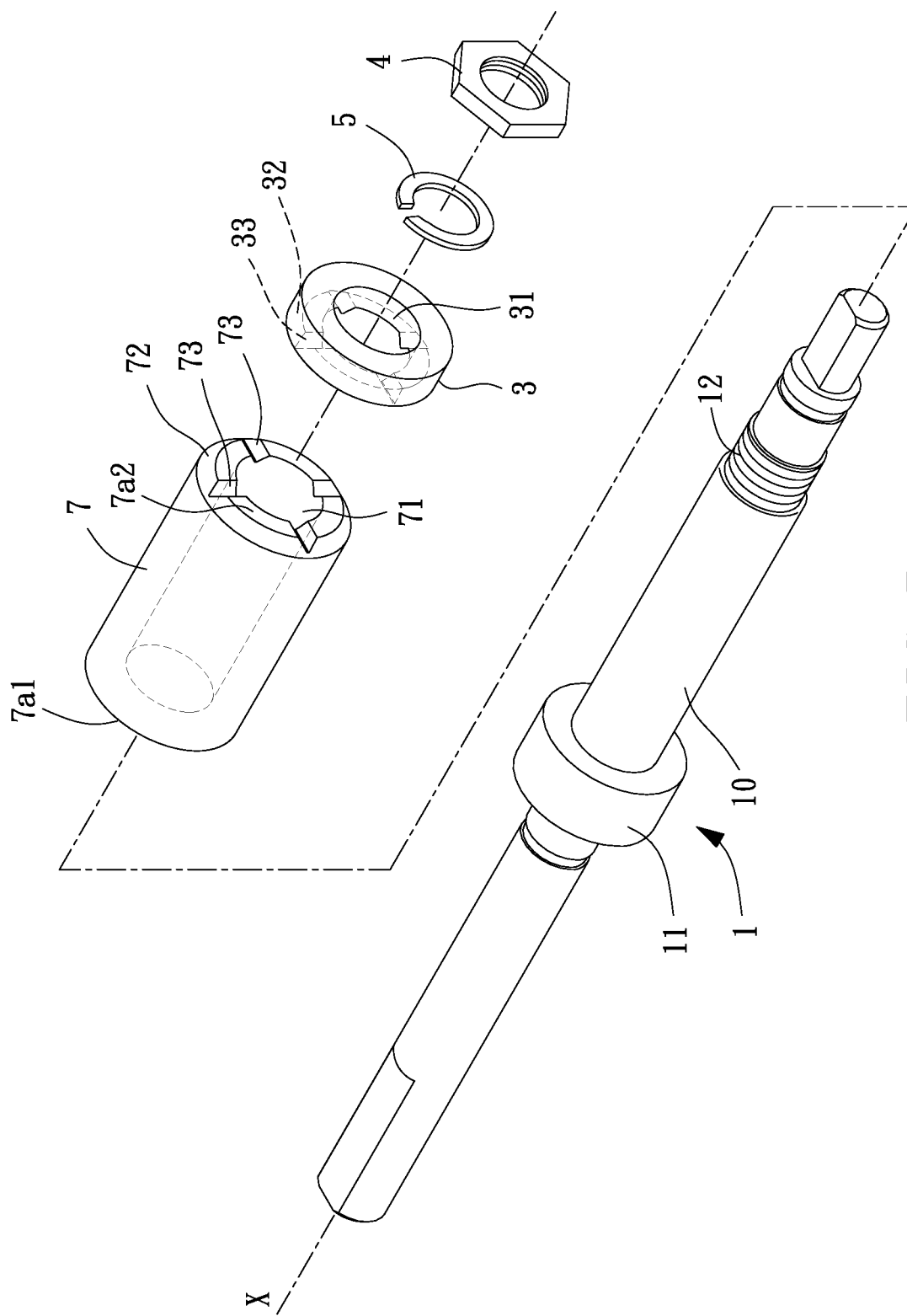
FIG. 5 is an exploded, perspective view of a rotor of an inner-rotor motor of a third embodiment according to the present invention.

FIG. 5 shows a rotor of an inner-rotor motor of a third embodiment according to the present invention. In this embodiment, the connecting portion 10 of the shaft 1 has circular cross sections. The permanent magnet 7 is a single annular member which can be of a design of integral formation. The permanent magnet 7 includes a through-hole 71 having circular cross sections for matching with the connecting portion 10 of the shaft 1. The first end 7a1 of the permanent magnet 7 is flat and directly abuts against the first positioning portion 11 of the shaft 1. The first engaging portion 72 of the second end 7a2 of the permanent magnet 7 is coupled with the second engaging portion 32 of the at least one coupling member 3. Furthermore, the second end 7a2 of the permanent magnet 7 includes a plurality of first coupling portions 73. The at least one coupling member 3 further includes a plurality of second coupling portions 33 for coupling the at least one coupling member 3 to the permanent magnet 7. In an example, each first coupling portion 73 is a V-shaped groove, and each second coupling portion 33 is an inverted V-shaped protrusion. Thus, each first coupling portion 73 and a respective second coupling portion 33 can couple with each other.

With reference to FIG. 5, according to the above structure, in comparison with the first embodiment, when the shaft 1 extends through the through-hole 71 of the permanent magnet 7, since the permanent magnet 7 is a single annular member which can be of a design of integral formation, the assembly between the shaft 1, the permanent magnet 7, and the at least one coupling member 3 is more convenient while effectively preventing the permanent magnet 7 from displacing axially relative to or falling off from the shaft 1 as well as preventing the permanent magnet 7 from moving in a radial direction perpendicular to the rotating axis X of the shaft 1 or loosening in a circumferential direction.

Figure 6:
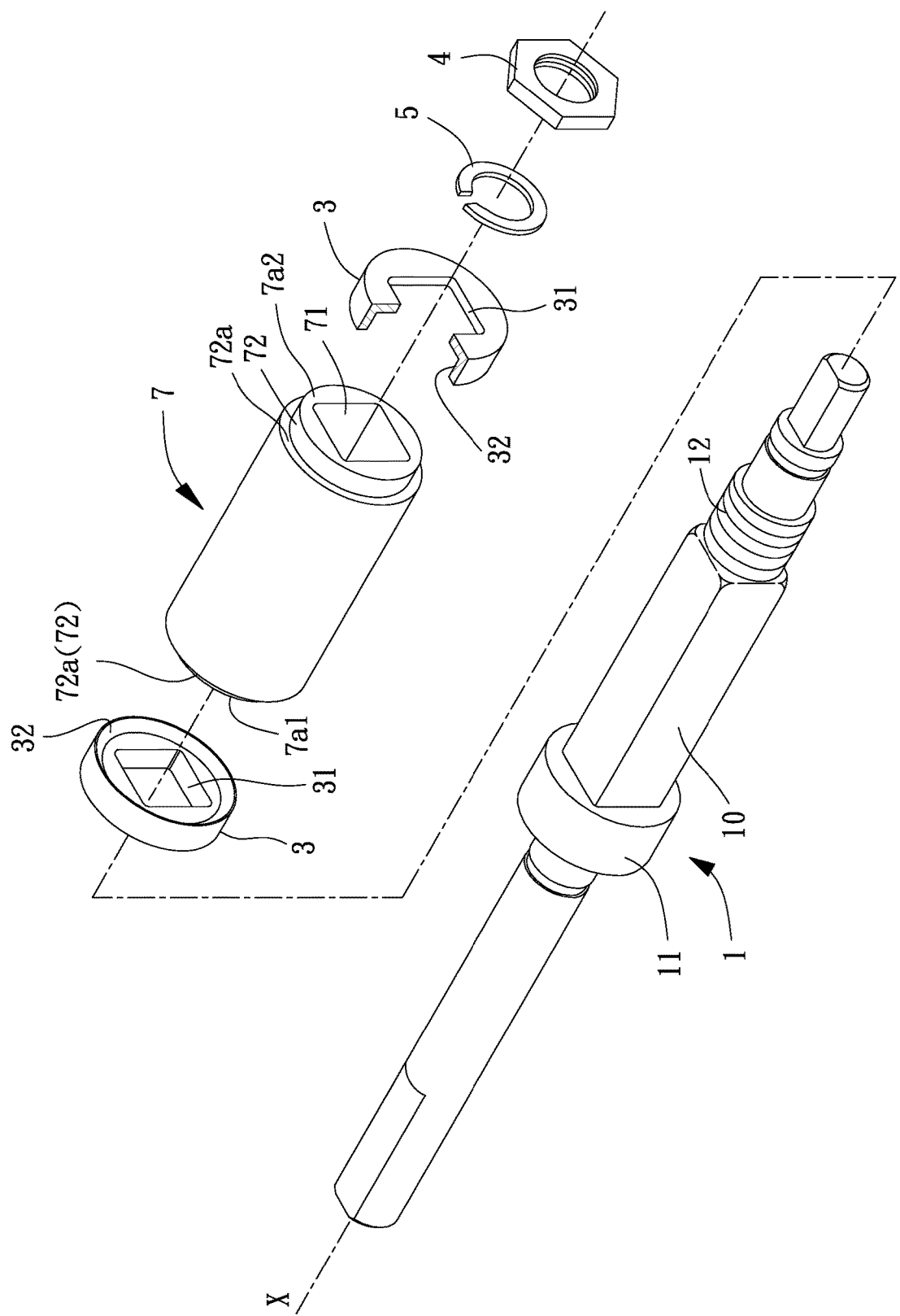
FIG. 6 is an exploded, perspective view of a rotor of an inner-rotor motor of a fourth embodiment according to the present invention.

FIG. 6 shows a rotor of an inner-rotor motor of a fourth embodiment according to the present invention. In this embodiment, the connecting portion 10 of the shaft 1 has square cross sections. The permanent magnet 7 is a single annular member which can be of a design of integral formation. The permanent magnet 7 includes a through-hole 71 having square cross sections for matching with the connecting portion 10 of the shaft 1. Each first engaging portion 72 of the first end 7a1 and the second end 7a2 of the permanent portion 7 includes a reduced portion to form a shoulder 72a. In this embodiment, each second engaging portion 32 of the at least one coupling member 3 is in the form of a cap, such that each second engaging portion 32 of the at least one coupling member 3 engages with the respective one of the first engaging portions 72 of the first end 7a1 and the second end 7a2. Thus, each second engaging portion 32 of the at least one coupling member 3 can be coupled with the respective first engaging portion 72 of the permanent magnet 7.

With reference to FIG. 6, according to the above structure, in comparison with the first embodiment, when the shaft 1 extends through the through-hole 71 of the permanent magnet 7, since the permanent magnet 7 is a single annular member which can be of a design of integral formation, the assembly between the shaft 1, the permanent magnet 7, and the at least one coupling member 3 is more convenient. Furthermore, each first engaging portion 72 of the permanent magnet 7 has a reduced portion, and each second engaging portion 32 of the at least one coupling member 3 is in the form of a cap, such that the coupling area between the permanent magnet 7 and the at least one coupling member 3 is increased, providing enhanced coupling effect between the permanent magnet 7 and the at least one coupling member 3 while effectively preventing the permanent magnet 7 from displacing axially relative to or falling off from the shaft 1 as well as preventing the permanent magnet 7 from moving in a radial direction perpendicular to the rotating axis X of the shaft 1 or loosening in a circumferential direction.

In view of the foregoing, in the rotor of an inner-rotor motor according to the present invention, the permanent magnet 2, 6, 7 is mounted to the connecting portion 10 of the shaft 1, the at least one first engaging portion 21, 61, 72 of the permanent magnet 2, 6, 7 engages with the second engaging portion 33 of the at least one coupling member 3, and the fixing member 4 is coupled with the second positioning portion 12 of the shaft 1, such that the shaft 1, the permanent magnet 2, 6, 7 and the at least one coupling member 3 have enhanced coupling stability therebetween, effectively preventing the permanent magnet 2, 6, 7 from displacing axially relative to or falling off from the shaft 1 as well as preventing the permanent magnet 2, 6, 7 from moving in a radial direction perpendicular to the rotating axis X of the shaft 1 or loosening in a circumferential direction.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A rotor of an inner-rotor motor comprising:
    a shaft including a connecting portion;
    a permanent magnet encircling the connecting portion of the shaft without being intervened in a circumferential direction of the permanent magnet, wherein the permanent magnet includes at least one first engaging portion; and
    at least one coupling member including a through-hole, wherein the shaft extends through the through-hole, wherein the at least one coupling member includes a second engaging portion engaged with the at least one first engaging portion of the permanent magnet, and wherein a cross section of the connecting portion of the shaft is convex polygonal and perpendicular to a rotating axis of the shaft.

2. The rotor of the inner-rotor motor as claimed in claim 1, wherein the shaft further includes a first positioning portion, wherein the at least one coupling member is coupled to an end of the permanent magnet, and wherein another end of the permanent magnet abuts against the first positioning portion.

3. The rotor of the inner-rotor motor as claimed in claim 2, wherein an outer diameter of the first positioning portion is smaller than or equal to an outer diameter of the at least one coupling member, and wherein the outer diameter of the at least one coupling member is smaller than or equal to an outer diameter of the permanent magnet.

4. The rotor of the inner-rotor motor as claimed in claim 1, wherein the permanent magnet consists of a plurality of magnet segments.

5. The rotor of the inner-rotor motor as claimed in claim 4, wherein the plurality of magnet segments has an identical structure.

6. The rotor of the inner-rotor motor as claimed in claim 4, wherein the permanent magnet consists of four magnet segments.

7. The rotor of the inner-rotor motor as claimed in claim 4, wherein the permanent magnet consists of two magnet segments.

8. The rotor of the inner-rotor motor as claimed in claim 1, wherein the permanent magnet is a single annular member.

9. The rotor of the inner-rotor motor as claimed in claim 8, wherein the permanent magnet includes a through-hole, and wherein the connecting portion of the shaft is received in the through-hole.

10. The rotor of the inner-rotor motor as claimed in claim 1, wherein the at least one coupling member includes two coupling members.

11. The rotor of the inner-rotor motor as claimed in claim 1, wherein each of the at least one first engaging portion and the second engaging portion includes a conical face having a slope.

12. The rotor of the inner-rotor motor as claimed in claim 11, wherein the slope of the at least one first engaging portion and the slope of the second engaging portion are complementary to each other.

13. The rotor of the inner-rotor motor as claimed in claim 1, wherein the at least one first engaging portion of the permanent magnet includes a reduced portion to form a shoulder, wherein the second engaging portion of the at least one coupling member is in a form of a cap, and wherein the second engaging portion engages with the at least one first engaging portion.

14. The rotor of the inner-rotor motor as claimed in claim 1, further comprising a fixing member, wherein the shaft further includes a second positioning portion, and wherein the fixing member is coupled to the second positioning portion of the shaft.

15. The rotor of the inner-rotor motor as claimed in claim 14, further comprising a pad member mounted around the shaft and located between the at least one coupling member and the fixing member.

16. The rotor of the inner-rotor motor as claimed in claim 1, wherein the connecting portion includes a convex polygon end with rounded corners adjacent to the at least one coupling member.

17. The rotor of the inner-rotor motor as claimed in claim 1, wherein the permanent magnet further includes at least one first coupling portion, wherein the at least one coupling member further includes at least one second coupling portion coupled with the at least one first coupling portion.

18. The rotor of the inner-rotor motor as claimed in claim 17, wherein each of the at least one first coupling portion is a V-shaped groove, and wherein each of the at least one second coupling portion is an inverted V-shaped protrusion.

19. The rotor of the inner-rotor motor as claimed in claim 1, wherein an axial length of the connecting portion of the shaft is larger than an axial length of the permanent magnet.

* * * * *